US010862308B2

United States Patent
Brombach

(10) Patent No.: US 10,862,308 B2
(45) Date of Patent: Dec. 8, 2020

(54) METHOD FOR SUPPLYING ELECTRIC POWER INTO AN ELECTRIC SUPPLY NETWORK BY MEANS OF A CONVERTER-CONTROLLED SUPPLY DEVICE

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/622,201

(22) PCT Filed: Jun. 7, 2018

(86) PCT No.: PCT/EP2018/065028
§ 371 (c)(1),
(2) Date: Dec. 12, 2019

(87) PCT Pub. No.: WO2018/228917
PCT Pub. Date: Dec. 20, 2018

(65) Prior Publication Data
US 2020/0119560 A1    Apr. 16, 2020

(30) Foreign Application Priority Data

Jun. 13, 2017 (DE) .................. 10 2017 113 006

(51) Int. Cl.
*H02J 3/38* (2006.01)
*H02J 3/16* (2006.01)
(Continued)

(52) U.S. Cl.
CPC .................. *H02J 3/38* (2013.01); *F03D 7/00* (2013.01); *F03D 9/00* (2013.01); *H02J 3/16* (2013.01); *H02P 9/04* (2013.01); *H02P 9/10* (2013.01)

(58) Field of Classification Search
CPC ...... H02J 3/16; H02J 3/38; F03D 7/00; F03D 9/00; H02P 9/04; H02P 9/10
(Continued)

(56) References Cited

U.S. PATENT DOCUMENTS 7,071,579 B2 *   7/2006   Erdman ................ F03D 7/0284
                                                            290/55
7,569,944 B2 *   8/2009   Oohara .................. F03D 9/255
                                                            290/44
(Continued)

FOREIGN PATENT DOCUMENTS

DE              910926 B        5/1954
DE           10212107602 A1    5/2014
(Continued)

OTHER PUBLICATIONS

"What is feed-in management?" Next Kraftwerke GmbH, retrieved Dec. 10, 2019, from https://www.next-kraftwerke.de/wissen/einspeisemanagement, 16 pages (with English Machine Translation).

*Primary Examiner* — Pedro J Cuevas
(74) *Attorney, Agent, or Firm* — Seed IP Law Group LLP

(57) ABSTRACT

Provided is a method for feeding electric power into an electricity supply grid having a grid voltage at a grid frequency having a grid nominal frequency. Feeding the electric power is performed by a converter-controlled feeding-in device, which may be a wind farm or a wind turbine. The feeding-in device feeds in an infeed current as electric AC current having a frequency, a phase, an infeed voltage and a fed-in power. The infeed voltage may be set. The
(Continued)

method includes estimating a converter proportion in a grid section of the electricity supply grid that represents a ratio of power fed in by way of converters to overall fed-in power and controlling the infeed of the electric power depending on the estimated converter proportion.

24 Claims, 6 Drawing Sheets

(51) Int. Cl.
  *F03D 7/00* (2006.01)
  *H02P 9/04* (2006.01)
  *H02P 9/10* (2006.01)
  *F03D 9/00* (2016.01)
(58) Field of Classification Search
  USPC .................................................... 290/44, 55
  See application file for complete search history.

(56) References Cited

U.S. PATENT DOCUMENTS

| | | | | |
|---|---|---|---|---|
| 7,602,627 B2* | 10/2009 | Ohshima | ............ | H02M 7/53871 363/140 |
| 7,889,527 B2* | 2/2011 | Ohshima | ............... | H02M 7/493 363/97 |
| 7,919,879 B2* | 4/2011 | Flannery | ................. | H02P 9/007 290/44 |
| 8,093,740 B2* | 1/2012 | Oohara | ................. | F03D 7/0224 290/44 |
| 8,310,074 B2* | 11/2012 | Larsen | .................... | H02P 29/50 290/44 |
| 8,390,138 B2* | 3/2013 | Fortmann | ............. | F03D 7/0284 290/44 |
| 8,400,003 B2* | 3/2013 | Letas | ....................... | H02P 9/007 290/44 |
| 8,577,508 B2* | 11/2013 | Li | ........................ | H02M 3/156 700/287 |
| 8,860,236 B2* | 10/2014 | Nasiri | ..................... | F03D 7/044 290/44 |
| 9,240,721 B2 | 1/2016 | Babazadeh | ......... | H02M 3/1584 |
| 10,683,846 B2* | 6/2020 | Brombach | ............. | F03D 9/007 |
| 10,731,631 B2* | 8/2020 | Tan | ........................ | F03D 7/042 |
| 2003/0227172 A1* | 12/2003 | Erdman | .................. | F03D 7/048 290/44 |
| 2006/0245221 A1* | 11/2006 | Ohshima | ........... | H02M 7/53871 363/131 |
| 2007/0278797 A1* | 12/2007 | Flannery | ................. | H02P 9/102 290/44 |
| 2008/0277938 A1* | 11/2008 | Oohara | ................. | F03D 7/0224 290/44 |
| 2009/0261589 A1* | 10/2009 | Oohara | ................. | F03D 7/0284 290/44 |
| 2009/0310390 A1* | 12/2009 | Ohshima | ........... | H02M 7/53871 363/71 |
| 2010/0052322 A1* | 3/2010 | Fortmann | ................ | H02J 3/381 290/44 |
| 2010/0109328 A1* | 5/2010 | Li | ........................... | H02P 21/24 290/44 |
| 2010/0320762 A1* | 12/2010 | Letas | ........................ | F03D 9/25 290/44 |
| 2011/0089693 A1* | 4/2011 | Nasiri | ..................... | F03D 7/046 290/44 |
| 2011/0101689 A1* | 5/2011 | Larsen | .................... | F03D 9/255 290/44 |
| 2012/0104756 A1* | 5/2012 | Beekmann | ................ | H02J 3/24 290/44 |
| 2013/0328309 A1* | 12/2013 | Fujii | ........................ | H02J 3/381 290/44 |
| 2014/0015500 A1* | 1/2014 | Babazadeh | ......... | H02M 3/1584 323/272 |
| 2015/0069836 A1 | 3/2015 | Beekmann | | |
| 2015/0148974 A1 | 5/2015 | Diedrichs | | |
| 2015/0280629 A1 | 10/2015 | Diedrichs et al. | | |
| 2016/0169199 A1* | 6/2016 | Beekmann | ................ | H02J 3/24 290/44 |
| 2018/0372074 A1* | 12/2018 | Brombach | .............. | H02J 3/381 |
| 2019/0036342 A1* | 1/2019 | Brombach | ................ | H02J 3/46 |
| 2019/0067943 A1* | 2/2019 | Brombach | .............. | F03D 7/048 |
| 2019/0211803 A1* | 7/2019 | Brombach | .............. | F03D 9/255 |
| 2019/0348902 A1* | 11/2019 | Heyen | ..................... | H02J 3/381 |
| 2020/0028367 A1* | 1/2020 | Brombach | ................ | H02J 3/14 |
| 2020/0044448 A1* | 2/2020 | Brombach | ................ | H02J 3/40 |
| 2020/0076193 A1* | 3/2020 | Biris | ....................... | F03D 9/255 |
| 2020/0116127 A1* | 4/2020 | Brombach | .............. | H02J 3/381 |
| 2020/0136540 A1* | 4/2020 | Brombach | ................ | H02J 3/08 |
| 2020/0176993 A1* | 6/2020 | Brombach | ................ | H02J 3/48 |

FOREIGN PATENT DOCUMENTS

| | | |
|---|---|---|
| EP | 2182626 A1 | 5/2010 |
| EP | 2463979 A1 | 6/2012 |
| RU | 2597235 C2 | 9/2016 |

* cited by examiner

METHOD FOR SUPPLYING ELECTRIC POWER INTO AN ELECTRIC SUPPLY NETWORK BY MEANS OF A CONVERTER-CONTROLLED SUPPLY DEVICE

BACKGROUND

Technical Field

The present invention relates to a method for feeding electric power into an electricity supply grid by way of a converter-controlled feeding-in device, in particular by way of a wind farm or at least one wind turbine. The invention also relates to such a wind farm and to such a wind turbine.

Description of the Related Art

Wind turbines and wind farms in particular feed electric power into the electricity supply grid in a converter-controlled manner. For this purpose, they use frequency converters or frequency inverters, which are referred to for the sake of simplicity as converters or inverters. Other generators, such as for example PV facilities, may also however in principle perform feeding in a converter-controlled manner.

Performing feeding by way of converter-controlled feeding-in devices is known and may increasingly also be used to support the electricity supply grid. The converter-controlled feeding-in devices therefore do not necessarily concentrate just on merely performing feeding, but rather adapt their behavior, including possibly to particular grid states. Frequency-dependent adjustment of the fed-in active power in particular comes into consideration, as does a voltage-dependent change of the fed-in reactive power, wherein the voltage in this case relates to the grid voltage of the electricity supply grid or to a voltage that is equivalent or proportional thereto.

Converter-controlled feeding-in devices are in this respect very fast control devices in the electricity supply grid. They are able to respond very quickly to changes and thereby act in a regulating or controlling and therefore supportive manner.

With an increasing proportion of such converter-controlled feeding-in devices in the electricity supply grid, the problem may however occur that, due to the large number of possibly fast-controlling feeding-in devices, a certain amount of turbulence also arises in the electricity supply grid. A relatively high proportion of converter-controlled feeding-in devices also means that the proportion of large power plants that perform feeding by way of synchronous generators that are coupled directly to the electricity supply grid decreases. The sluggish effect of such large power plants or their large synchronous generators may thereby be attenuated.

Such directly coupled synchronous generators furthermore on principle operate in a voltage-impressing manner, whereas converter-controlled feeding-in devices usually operate in a current-impressing manner. This may therefore result in the voltage support being attenuated. An additional issue here is that converter-controlled feeding-in devices are normally set up in a decentralized manner. This may also make voltage support more difficult.

Such a problem may in principle be countered by adapting the converter-controlled feeding-in devices in terms of control technology, or a more stable grid topology may be created. However, it is often the case that the grid topology is usually developed more slowly than renewable generation units are set up, these usually being designed as converter-controlled feeding-in devices or using such converter-controlled feeding-in devices in order to perform feeding. For this reason, it is already proposed to adapt converter-controlled feeding-in devices to such an attenuated grid in terms of control technology or to take such properties into consideration. Corresponding proposals are described for example in the two US applications US 2015/0280629 A1 and US 2015/0148974 A1.

The German Patent and Trademark Office searched the following prior art in the priority application for the present application: DE 10 2012 107 602 A1, DE 910 926 B, US 2015/0 148 974 A1, US 2015/0 280 629 A1 and EP 2 182 626 A1.

BRIEF SUMMARY

Provided herein are techniques for supplying electric power into an electric supply network that take into account changes in properties of the electricity supply grid.

A method is provided for feeding electric power into an electricity supply grid by way of a converter-controlled feeding-in device. It is in particular proposed for the feeding-in device to be a wind turbine or a wind farm. A converter-controlled feeding-in device is in this case understood to mean that this feeds into the electricity supply grid by way of a converter or inverter, that is to say in particular not via a synchronous generator coupled directly to the electricity supply grid.

The electricity supply grid in this case has a grid voltage at a grid frequency and a grid nominal frequency. The grid nominal frequency is thus the grid frequency that should ideally be used and for which the electricity supply grid and therefore all of the consumers and feeders connected thereto are thus designed. 50 Hz or 60 Hz in particular come into consideration as grid nominal frequency.

The converter-controlled feeding-in device feeds into the electricity supply grid at a grid connection point, and the grid voltage under consideration is in particular the one that is present on the grid side at this grid connection point and is also recorded there.

The feeding-in device for feeding in electric power feeds an infeed current as AC current into the electricity supply grid. This AC current has a frequency and a phase and is fed in with an infeed voltage. Such an infeed voltage is in particular present at the output of the converter-controlled feeding-in device, that is to say at the output of the inverter or converter, or at the output of a downstream choke. The fed-in power is able to be determined by way of the amplitude of the infeed current and its phase in relation to the infeed voltage. The phase or a phase angle between the infeed current and the infeed voltage may in particular be used to perform a division into active power and reactive power.

It is proposed or taken as a basis for the frequency of the infeed current, the phase of the infeed current, the fed-in power and the infeed voltage to be able to be set. The converter-controlled feeding-in device is thus able to be regulated or controlled in terms of these variables.

The feeding in then first of all comprises the step of estimating a converter proportion in a grid section of the electricity supply grid. This converter proportion specifies a ratio of converter-controlled feeding-in devices to non-converter-controlled feeding-in devices. The ratio in this case however relates to the fed-in power. Specifically, it conveys the fed-in power that has been fed in by way of converter-controlled feeding-in devices, that is to say by way of converters or inverters, as a ratio to the overall fed-in power, that is to say power that is fed in by way of converter-controlled feeding-in devices and additionally the remaining power that is fed in in particular by way of directly coupled synchronous generators. In this case, not only the power of the present converter-controlled feeding-in device, but rather the power of all of the converter-controlled feeding-in devices in the grid section under consideration, is taken into account. If for example all of the converter-controlled feeding-in devices in the grid section under consideration thus feed in 4 GW and large power plants having directly coupled synchronous generators additionally feed 4 GW into the same grid section, then the converter proportion is 0.5 or 50%.

It is then proposed to control the infeed of the electric power depending on the estimated converter proportion.

This is thus based initially on the concept that any status analysis is performed at all as to what the converter proportion is in the electricity supply grid. It is possible to derive from this the tendency of the fundamental grid behavior of the grid section under consideration. This does not necessarily involve estimating such a proportion to within 1% accuracy, but rather assessing the overall behavior to be expected. A first important question is in particular whether directly coupled synchronous generators are dominant in the grid section, or whether converter-controlled feeding-in devices are dominant. A control operation is thus able to be adapted depending thereon. In particular if directly coupled synchronous generators are dominant, it is in principle able to be assumed that these also achieve adequate voltage support and frequency support by way of the respective inertia. If however converter-controlled feeding-in devices are dominant, then it may be expedient for the converter-controlled feeding-in devices, or at least some of them, to take over support tasks and to be controlled for example in a manner derived from the behavior of a directly coupled synchronous generator.

A converter proportion in a grid section, which may also be referred to as converter proportion of the grid section, may for example be estimated such that known information about the grid topology of this grid section is used and the converter proportion is estimated together with recorded power data or together with provided power data. By way of example, the nominal power of the converter-controlled feeding-in devices coupled to the grid section may be known. If these converter-controlled feeding-in devices are just wind turbines or just wind farms, then the overall fed-in power of the converter-controlled feeding-in devices may in particular be inferred in the case of a spatially confined area from the power of one or more such converter-controlled feeding-in devices. If for example one wind farm of a plurality of wind farms that are connected to the grid section under consideration is thus considered, and this wind farm feeds in roughly 50% of its nominal power, it may be roughly estimated that all of the other wind farms in this grid section, that is to say all of the other wind farms in the vicinity, likewise feed in roughly 50% of their nominal power and this value, that is to say 50% of the overall nominal power of all of these wind farms connected to this grid section, may be considered to be the fed-in power of the converter-controlled feeding-in devices in this grid section. Information about the fed-in power of the large power plants having a directly coupled synchronous generator may often be obtained from the grid operator. Moreover, it of course also comes into consideration for the wind farms that their power is known by way of a data exchange, for example via what is known as a SCADA system.

Other possibilities however also come into consideration, such as for example inferring the corresponding proportions from grid states.

It is preferably proposed for a cyclic change in the grid frequency in terms of amplitude and/or cycle time to be recorded and for the converter proportion to be estimated depending on the recorded amplitude and/or the recorded cycle time. In this respect, it has been recognized that such a cyclic change in the grid frequency may provide information about a converter proportion in the electricity supply grid. By virtue of this consideration, a restriction is moreover quite obviously made to one grid section, as it were, in any case when the electricity supply grid is very large, such as for example the European integrated grid.

In this case, the converter proportion is preferably estimated to be greater the greater the amplitude of the cyclic change. In addition or as an alternative, the converter proportion is estimated to be greater the shorter the cycle time. The converter proportion is thus able to be estimated on the basis of the amplitude of the cyclic change. It has been recognized in this case that the grid frequency oscillates with an amplitude that is greater the greater the converter proportion in the grid.

It has likewise been recognized that the cycle time is shorter the greater the converter proportion in the grid. The grid frequency oscillates more quickly in the case of a high converter proportion.

These two criteria may also be considered at the same time, and it is in particular proposed to take a quotient of the amplitude of the change to the cycle time of the change as a basis. The greater this quotient, the greater also the converter proportion should be estimated to be. This quotient in particular has the advantage that a large amplitude indicates a high converter proportion and a short cycle time of the change likewise indicates a high converter proportion. By virtue of the quotient, in this case of a high converter proportion, a relatively high amplitude is thus divided by a relatively short cycle time, such that the significance of both variables supports one another.

Empirical values or grid simulations may be taken as a basis for example for the actual evaluation.

It is preferably proposed for a distinction to be drawn between a high and a low converter proportion as an estimate of the converter proportion. In this case, a high converter proportion is estimated when the amplitude of the cyclic change is greater than a predefined amplitude limit. In addition or as an alternative, it is proposed for a high converter proportion to be estimated when the cycle time is shorter than a predefined cycle time limit. These limits may thus be used to establish clearly definable criteria. It should be borne in mind in this case that the result is still an estimate. Slight deviations may thus occur. This may be taken into account in the limit that is respectively to be selected, that is to say the amplitude limit or the cycle time limit. The limit may thus be set such that a high converter proportion may only be assumed when this is also actually significantly high and it is advisable to adapt the control operation.

Both criteria may also be combined here and a quotient limit may be predefined for taking into consideration a quotient of the amplitude of the change to the cycle time of the change.

According to one embodiment, it is proposed for a frequency of occurrence or frequency of occurrence density of the frequency or of a frequency gradient to be recorded, and for the converter proportion to be estimated depending on the recorded frequency of occurrence or frequency of occurrence density. By way of example, a relevant frequency range around the nominal frequency may be divided into 0.05 Hz sections. For each 0.05 Hz section, the durations for which the frequency has occurred in the corresponding 0.05 Hz sections may then be summed. For each of the 0.05 Hz sections, this gives an absolute value, for example in seconds, and this may be specified for example as a percentage value with respect to the overall test duration. These values may then accordingly be plotted on a corresponding graph for the respective 0.05 Hz sections. It should be expected in this case that for example a curve resembling a Gaussian bell curve will result. This curve then indicates the frequency of occurrence of the frequency.

Instead of this, it is also possible to record a frequency of occurrence density that ultimately corresponds to this frequency of occurrence but in particular makes do without a division into discrete sections, that is to say without a division into the 0.05 Hz sections cited by way of example. The frequency of occurrence density of the frequency is the frequency of occurrence divided by the width of the frequency section for which it was established. The above example may thus be converted into a frequency of occurrence density when the respective frequencies of occurrence are divided by 0.05 Hz, since this is precisely the width of the respective frequency section, that is to say the width of the respective 0.05 Hz section.

This results in terms of quality in a similar curve and, in this case too, a bell curve similar to a Gaussian bell curve should thus be expected. The type of this curve, that is to say in particular the type of this bell, may provide information as to how great the converter proportion in the grid is. A relatively narrow bell curve in particular indicates a lower converter proportion in the grid than a wide, flat bell curve. In any case, however, the middle of the bell curve would be expected to be at roughly the nominal frequency. This expectation is met in particular in the European integrated grid in that the European integrated grid is in principle controlled such that the frequency is on average exactly 50 Hz.

A frequency gradient may be considered instead of the frequency. The frequency gradient is the time derivative of the frequency and a frequency of occurrence or frequency of occurrence density may also be recorded for this purpose. When considering the frequency of occurrence or frequency of occurrence density of the frequency gradient, it is in principle possible to apply the same evaluation criteria as when considering the frequency of occurrence or frequency of occurrence density of the frequency. In this respect, the explanations in terms of the frequency apply analogously to the consideration of the frequency gradients, unless stated otherwise or not obviously underlying another context. A consideration based on the frequency gradient may however be more sensitive than the consideration based on the frequency.

An embodiment that evaluates this frequency of occurrence or frequency of occurrence density assumes that the frequency of occurrence or frequency of occurrence density forms a frequency of occurrence function depending on the frequency. This basically corresponds to the already mentioned bell-like curve to be expected. This frequency of occurrence function, which leads to a curve, in particular bell-like curve, in the illustration cited for illustrative purposes, has a frequency of occurrence maximum value in a region of a main frequency. The main frequency is in particular the grid nominal frequency, but may also deviate therefrom. In the already cited example of the European integrated grid, this is 50 Hz. In the US grid it would be 60 Hz, to name another example.

The frequency of occurrence function increases from a predefined starting frequency that is less than the main frequency to the region of the main frequency. The starting frequency may for example be 48 Hz for a main frequency of 50 Hz.

From the region of the main frequency, the frequency-dependent frequency of occurrence function drops to a predefined end frequency that is greater than the main frequency. This predefined end frequency may be for example a value of 52 Hz in the case of a main frequency of 50 Hz. The frequency of occurrence function thus increases from the starting frequency to the main frequency and drops from there back to the end frequency.

This frequency-dependent frequency of occurrence function has a lower frequency of occurrence reference value at a lower reference frequency that is greater than the starting frequency and less than the main frequency. This lower frequency of occurrence reference value is thus between the predefined starting frequency and the main frequency. The frequency-dependent frequency of occurrence function furthermore has an upper frequency of occurrence frequency value at an upper reference frequency that is greater than the main frequency and less than the end frequency. A frequency of occurrence reference value is thus also provided between the main frequency and the end frequency.

This frequency-dependent frequency of occurrence function thus increases from the starting frequency, above the lower reference frequency to the main frequency, and then drops from there back above the lower reference frequency to the end frequency.

The converter proportion is then estimated for this frequency-dependent frequency of occurrence function depending on the frequency of occurrence maximum value. The frequency of occurrence maximum value thus provides information as to whether the converter proportion in the grid or grid section is high or low. A low converter proportion should in particular be assumed in the case of a high frequency of occurrence maximum value, and vice versa.

In addition or as an alternative, it is proposed, in one variant, to estimate the converter proportion depending on a distance between the lower and upper reference frequency that in each case sets in at a predefined lower or upper frequency of occurrence reference value, wherein the lower and upper frequency of occurrence reference value may be the same. In other words, the width of the frequency of occurrence function is taken here as a basis by way of this distance between the two reference frequencies. Since the width of the curve changes with the magnitude, that is to say the respective frequency of occurrence value, this magnitude is defined by the upper and lower frequency of occurrence reference value if these are the same. This width may thereby form a reproducible criterion.

The converter proportion is then estimated depending on a distance between these two values, that is to say the distance between the upper and lower reference frequency. The converter proportion is in this case greater or is estimated to be greater the wider the distance between these two reference frequencies.

If the two frequency of occurrence values are not the same, the distance between the two frequency values may still serve as a criterion, and it is then only necessary to dispense with clearly describing the width of the curve.

As an alternative, it is proposed for the converter proportion to be estimated depending on the lower and/or upper frequency of occurrence reference value that sets in respectively for a predefined lower or upper reference frequency. A selection is made here based on the reverse approach by predefining one of the two reference frequencies, and the associated frequency of occurrence value, which is referred to here as frequency of occurrence reference value, forms a reproducible criterion.

In this case, the magnitude of one or both frequency of occurrence reference values may thus be taken as a basis as the criterion for estimating a converter proportion in the grid. Both values may also be considered at the same time, for example by forming an average.

In terms of content, it is proposed for the evaluation or estimation for the converter proportion to be estimated to be greater the lower the frequency of occurrence maximum value. In addition or as an alternative, the converter proportion is estimated to be greater the greater the distance between the upper and lower reference frequency or, for the alternative, it is proposed for the converter proportion to be estimated to be greater the greater the upper or the lower frequency of occurrence reference value.

As a result, it is possible to define fixed comparison values such that a corresponding evaluation may also be performed in a manner implemented in a computer. Only the frequency of occurrence or the frequency of occurrence spectrum needs to be recorded, thereby giving said frequency-dependent frequency of occurrence function. Only said criteria or at least one thereof then need to be evaluated for this frequency of occurrence function.

According to one embodiment, it is proposed for a distinction to be drawn between a high and a low converter proportion as an estimate of the converter proportion. For this purpose, a high converter proportion is estimated when the frequency of occurrence maximum value lies below a predefined frequency of occurrence maximum value. By evaluating a frequency-dependent frequency of occurrence function, it is thereby easily possible, through comparison with the predefined frequency of occurrence limit value, to perform at least this split between high and low converter proportion.

In addition or as an alternative, a high converter proportion is estimated when the distance between the lower and upper reference frequency is greater than a predefined reference distance. In this case too, said function may easily be evaluated, including in a manner able to be implemented on a computer, by simply performing a comparison between the predefined reference section.

Or, for the corresponding alternative embodiment, there is provision for a high converter proportion to be estimated when the upper and/or lower frequency of occurrence reference value lies above a predefined basic limit value. In this case, one of the two amplitudes of the frequency of occurrence function is thus compared with a predefined basic limit value. The values of the frequency of occurrence function at the lower and upper reference frequency are used as amplitudes. A simple and unambiguous check criterion is thereby able to be predefined.

It also comes into consideration to combine these criteria. Each criterion may provide an estimate as to whether a high or low converter proportion is present. In this respect, contradictory evaluation results may in principle emerge. In this case, it would rather be assumed that the converter proportion has roughly a middling value. If however the criteria give the same evaluation result, then a particularly reliable value or particularly reliable result may be assumed. It may then furthermore also be assumed that the converter proportion is particularly high or particularly low.

According to a further embodiment, it is proposed for the frequency of occurrence or frequency of occurrence density of a reference function to be predefined and for the converter proportion to be estimated depending on a deviation of the frequency of occurrence function from this reference function. The reference function thus reflects a frequency of occurrence or frequency of occurrence density for a known converter proportion and then serves as a guide. The frequency of occurrence function is in this respect the respectively currently recorded frequency of occurrence or frequency of occurrence density as a function of the frequency. In the case of normalized functions, comparing a characteristic value, for example a maximum magnitude, may be sufficient.

It has now been recognized that the frequency of occurrence function tends to run flatter with a higher converter proportion. In particular when considering the frequency of occurrence density or a normalized frequency of occurrence, it should be expected that the areas of both curves, that is to say of the reference function and also of the currently recorded frequency of occurrence function, will be of the same size. A flatter curve is in this respect a curve that has higher values than the reference function in the region of the starting frequency and the end frequency but has lower values in the region of the main frequency. A statement is thus able to be made by comparing these two functions, that is to say the frequency of occurrence function and the reference function. These two functions may in particular for example be superimposed on one another and then a somewhat flatter profile of the recorded frequency of occurrence function in comparison with the reference function is readily discernible. The deviations may however also be evaluated in other ways, and also readily in an automated manner by computer programs.

According to a further embodiment, it is proposed for a frequency of occurrence function for a converter proportion of zero to be selected as reference function. A converter proportion of zero is thus taken as a basis as a starting point. Such a reference function, that is to say a frequency of occurrence function for this predefined situation, may be estimated beforehand by simulations. It however also comes into consideration to wait for a situation in which the converter proportion is zero or virtually zero at the grid connection point in question at which this frequency of occurrence function is intended to be investigated. By way of example, such a situation is often present when there is no wind or at least only a wind is blowing that is so weak that conventional wind turbines do not start up and it is at the same time for example night-time, such that no PV facilities feed into the electricity supply grid to be investigated either.

This reference function may then be assumed, and any indications that have also already been explained above that indicate a relatively high converter proportion may then always be applied with respect to this reference function, which gives a converter proportion of zero. The stronger the indications in question, that is to say to name one example the higher the frequency of occurrence maximum value, the greater the converter proportion. For this purpose, intermediate values or intermediate functions may also be recorded, these being able to be assigned a converter proportion other than zero, for example 10% and a further value or a further intermediate reference function for 20%, etc. A statement in terms of quantity about the converter proportion in the grid may then also be made depending thereon.

In principle, estimates are always proposed relatively small errors also being able to be taken into consideration. It should in particular be borne in mind that for example a high converter proportion is not estimated to be quite as high as it actually is if in this case converter-controlled feeding-in devices include those that behave like a synchronous machine, that is to say emulate a synchronous machine, by virtue of a specific control operation. In this case, such an estimation error would however also be desirable or advantageous because a converter-controlled feeding-in device that behaves like a synchronous machine ultimately also does not require any or requires less compensation.

In addition or as an alternative, it is proposed for a difference between the frequency of occurrence function and the reference function to be formed as a difference function. This difference function, in the regions in which it is positive, thus shows how greatly the recorded frequency of occurrence function lies above the reference function. This may be evaluated in order to assess the converter proportion. To this end, it is proposed for the difference function for the frequency regions below the lower reference frequency and above the upper reference frequency to be integrated so as to form a deviation integral. Only this part of the difference function is thus summed. Integrating the entire difference function should in any case have the value zero.

According to one variant, it is proposed to integrate the difference function from a low frequency, for example 0 Hz, in particular 40 Hz or 45 Hz in the case of 50 Hz nominal frequency, or 50 Hz or 55 Hz in the case of 60 Hz nominal frequency, until this results in a predetermined comparison difference value and, for this purpose, to take into consideration the frequency value at which the comparison difference value is reached. The converter proportion is preferably estimated to be greater the smaller this frequency value. 10% of the integral value of the reference function may for example be used as comparison difference value. It also comes into consideration to downwardly integrate the difference function analogously from a high frequency value, that is to say for example twice the nominal frequency (100 Hz or 120 Hz), in particular 60 Hz or 55 Hz in the case of 50 Hz nominal frequency or 70 Hz or 65 Hz in the case of 60 Hz nominal frequency and to take into consideration the frequency value that is reached where the integral reaches the comparison difference value.

According to a further variant, it is proposed to take into consideration an integral between two predetermined frequency values and to compare it with a comparison integral. These frequency values are preferably close to the nominal frequency and close to one another. By way of example, values of 49.8 Hz and 49.9 Hz may be used for this purpose when the nominal frequency is 50 Hz.

In addition or as an alternative, it is proposed for only the positive regions of the difference function to be integrated so as to form the deviation integral. If the upper and lower reference frequencies are set at the two intersections of the recorded frequency of occurrence function and the reference function, then this specifies precisely the point at which the difference function changes or reverses from its positive to its negative region. In this case, both of said variants correspond to the evaluation of the difference function. It is then proposed for the converter proportion to be estimated depending on the deviation integral. In order also to be able to perform an estimate in terms of quantity, corresponding value ranges may be predefined or set for this deviation integral. Such values may for example be predetermined by way of simulations. In particular when considering a frequency of occurrence density or a normalized frequency of occurrence, absolute values may be taken here as a basis, for example 0.2 or 0.3 for a middling converter proportion.

According to one embodiment, it is proposed for a converter proportion to be estimated depending on the value of the deviation integral such that, in the case of a deviation integral having the value zero, said converter proportion likewise has the value zero and, in the case of a value of the deviation integral of 0.5, it has the value 100%, and for values here in between these, a linear relationship between the converter proportion and the value of the deviation integral is assumed. The estimated converter proportion thus increases linearly with the value of the deviation integral, preferably from 0 to 100% for a value of the deviation integral from 0 to 0.5.

According to a further embodiment, it is proposed for the converter proportion to be estimated depending on a deviation of the main frequency from the grid nominal frequency, in particular such that the converter proportion is estimated to be greater the more the main frequency lies above the grid nominal frequency.

This embodiment is based on the finding that, in an electricity supply grid that has a significant proportion of converter-controlled generators, large power plants, that is to say the feeders having directly coupled synchronous machines, often tend toward a particular frequency compensation behavior. If wind turbines, wind farms or other converter-controlled feeding-in devices feed a significant amount of power into the electricity supply grid or announce this, in particular non-renewable large power plants that feed in by way of a directly coupled synchronous generator respond to the situation to be expected. This means that they are particularly well prepared to absorb a power drop from the renewable feeders. This however means that, precisely when it is not at all necessary to absorb part of the power, as is usually the case, they do not output this power, that is to say as a kind of reserve power as it were, to the electricity supply grid, and thereby tend toward an increase in rotational speed. Due to renewable feeders often having priority, this reserve power is therefore also not completely exhausted for frequency control purposes, such that this frequency deviation may occur within the context of a continuous control deviation.

This has been recognized and it has thus been recognized that a main frequency that lies above the grid nominal frequency thus indicates a high converter proportion. It is accordingly preferably proposed for the converter proportion to be estimated to be higher the more the main frequency lies above the grid nominal frequency.

According to a further embodiment, it is proposed for a fluctuation spectrum to be recorded. The fluctuation spectrum in this case represents fluctuations in the frequency over time as a frequency spectrum of a frequency, namely in particular the grid frequency. A frequency value is thus recorded for example over a predefined time period of for example in the region of 0.1 to 2 seconds, or in another way. Ideally, when the grid frequency does not fluctuate, only a single value, namely the grid nominal frequency, would be recorded as a constant value in this case. A spectrum, the proposed fluctuation spectrum, would then have only a steady component. If the grid nominal frequency is for example 50 Hz, there would thus be only one value in the spectrum, namely 50 Hz at 0 Hz. The recorded frequency is thus 50 Hz here, and does not fluctuate. For this consideration, the 50 Hz cited here by way of example form a steady component.

In actual fact, the grid frequency is usually however not constant but rather fluctuates, and these fluctuations are recorded over the symbolically mentioned time and thus lead to a fluctuating amplitude of the frequency, with said steady component of for example 50 Hz. These fluctuations over time may therefore also be investigated as a spectrum. If the frequency of 50 Hz, cited by way of example, thus for example fluctuates back and forth twelve times within a minute from 49.97 Hz to 50.03 Hz, this gives a spectral component at 0.2 Hz, namely $^{12}\!/_{60}$ s. The amplitude of this spectral value is in this case 0.3 Hz, because the fluctuation amplitude fluctuated from 49.97 Hz to 50.03 Hz. Transferred onto a graph, a frequency is thus plotted in each case both on the abscissa and on the ordinate.

For this purpose, it is then proposed for the converter proportion to be estimated depending on the fluctuation spectrum. It has in particular been recognized that such a frequency spectrum, that is to say the way in which the frequency fluctuates, that is to say how the frequency deviates from its ideal value of a constant grid nominal frequency, is a characteristic of the electricity supply grid that also relates in principle here, as also in conventional cases, to the grid connection point under consideration.

It is therefore likewise proposed to derive the converter proportion in the grid on the basis of such characteristics. By way of example, large directly coupled synchronous generators may lead to a constant grid oscillation which may, per generator, be reflected in a corresponding value in the frequency spectrum. In the case of a high converter proportion, it should be assumed that these do not bring about any such grid oscillations, but rather could bring about higher-frequency signals that in turn may be scattered accordingly due to a large number of individual converters. In this respect, noise behavior should be expected rather than isolated oscillating frequencies in the frequency spectrum, that is to say in the fluctuation spectrum, when the converter proportion is high.

It is preferably proposed for the converter proportion to be estimated depending on at least one fluctuation amplitude of a fluctuation frequency of the fluctuation spectrum. At least one value in the spectrum is thus taken into consideration, namely the fluctuation amplitude, and this results at a frequency of the spectrum that is referred to here as fluctuation frequency. An isolated, in particular prominent value is thus taken into consideration and a comparison measure may be predefined for this in order to estimate the converter proportion depending thereon.

Preferably, however, a plurality of such fluctuation amplitudes are then taken into consideration at another respective fluctuation frequency. In particular, in this case too, a comparison with a reference fluctuation spectrum may be proposed. A statement about the change of the electricity supply grid may then readily also be made in relation to the converter proportion from changes between the respectively currently recorded fluctuation spectrum and the reference fluctuation spectrum.

It is preferably proposed for the fluctuation frequency to lie in a range from 0.1 Hz to 0.5 Hz, and preferably for the converter proportion to be estimated to be smaller the greater the fluctuation amplitude here. This is based on the observation that this fluctuation amplitude is brought about by at least one directly coupled synchronous generator and thus not by a converter. Thus, the greater this amplitude, the more dominant therefore the directly coupled synchronous generator and, accordingly, the lower the converter proportion.

An FFT, that is to say what is known as a fast Fourier transform, may be applied in order to calculate this fluctuation spectrum. The steady component, that is to say in particular the grid nominal frequency, such as for example 50 Hz or 60 Hz, is preferably initially subtracted from the recorded frequency profile.

According to one embodiment, it is proposed for a voltage spectrum of the grid voltage to be recorded by way of an FFT of the grid voltage and for the converter proportion to be estimated depending on this voltage spectrum. It is thus proposed to evaluate the grid voltage by way of a fast Fourier transform, also referred to as FFT for short. Properties of the electricity supply grid are able to be recognized depending on this voltage spectrum, and a converter proportion is able to be inferred therefrom.

The converter proportion is preferably estimated to be smaller the greater a maximum value or a sum of a plurality of maximum values, or else the greater an average of a plurality of maximum values. In principle, a maximum value is in this case also to be expected at a main frequency, in particular at the grid frequency. Its magnitude provides information about the converter proportion in the grid, and the greater this value, the smaller the converter proportion is estimated to be. This voltage spectrum may in principle also be evaluated in the same way as has been described for the frequency of occurrence function, this hereby also being proposed in the form of embodiments. A very similar profile to the frequency of occurrence function may in principle also be assumed for this voltage spectrum. It may be advantageous, as is proposed here, to provide a reference voltage spectrum as comparison curve and in the same way to perform comparative evaluations such as have been described in connection with the frequency of occurrence function.

Applying the FFT in order to obtain the voltage spectrum however results in differences at least from a practical point of view. Recording a frequency of occurrence or frequency of occurrence density may in particular in fact involve heavy filtering if for example values are recorded in seconds or over similar time intervals. In the case of the evaluation using FFT, a very large number of sampled values per second are instead used and a frequency is also not determined for every sampled value, but rather the voltage is sampled and recorded as a voltage function and then evaluated in its entirety. This may result in particular in a difference that is able to be explained very clearly. Specifically, in the case of the voltage spectrum that was determined using the FFT, instead of a maximum value in the middle of the spectrum, that is to say at the main frequency, in particular at the grid frequency, a profile having two maximum values may result, these two maximum values essentially lying at a somewhat lower and somewhat higher frequency than the main frequency. The main frequency thus lies between these two maximum values and a maximum value then does not set in at the main frequency itself. This is due to the fact that the main frequency is often not exactly met or is not maintained for a long time, and rather frequencies in the vicinity occur, and this main frequency is achieved only for a brief time when changing from a somewhat higher to a somewhat lower frequency. The FFT records these subtleties that are often not recorded in the above-described recording of individual frequency values in order to determine a frequency of occurrence or frequency of occurrence density. This effect of two such maxima occurring may be brought about by a dead band in a primary control operation. These two maxima then occur roughly at the two edges of the dead band, because control is performed first of all there and the frequency is thereby kept fixed there for the first time, as it were.

It is therefore also proposed, as an alternative, instead of considering a maximum value, to consider a sum of a plurality of maximum values, in particular of two maximum values, or to consider an average of a plurality of maximum values. If the sum of a plurality of maximum values is divided by the number, it corresponds to an average and in this respect is subject only to a difference in scaling here. It is proposed in this case to scale the average up to the sum rather than to scale the sum down to the average by dividing by the number. This is based on the concept that the average of two such maximum values that lie just before and just after the main frequency is considerably lower than a single maximum value as results in the frequency of occurrence function. It may therefore actually be advantageous to use the sum of two maximum values, which then corresponds more to a single maximum value. Ultimately, however, this is a scaling issue and the estimation of the converter proportion essentially comes down to a comparison with a reference value, in particular with a reference voltage spectrum. As long as these values are scaled equally, the manner of the scaling is less important.

A distinction is preferably drawn between a high and a low converter proportion as an estimate of the converter proportion, and a high converter proportion is estimated when the maximum value, the sum of a plurality of maximum values or the average of a plurality of maximum values lies below a predefined reference value. A readily reproducible estimate may therefore be performed by way of this reference value. This estimate is also readily able to be implemented in a computer program or a corresponding evaluation unit (i.e, computer).

It is preferably proposed for the fed-in power to be changed by way of a power control operation depending on a frequency deviation and/or depending on a frequency gradient. The power control operation furthermore depends on the estimated converter proportion.

Such a frequency-dependent power control operation may therefore be adjusted to the converter proportion and accordingly respond appropriately to the situation that is thus recorded.

The power control operation in particular involves a controller gain and/or a controller time constant, and the controller gain or the controller time constant depends on the estimated converter proportion. It is thus proposed for the described frequency-dependent power control operation to be set with varying strictness in order thereby to respond to the specific grid situation, specifically whether a high or low converter proportion is in the grid.

It is in particular proposed for the controller gain to be selected to be greater and/or the controller time constant to be selected to be smaller the greater the estimated converter proportion. The basis here is the finding that, in the case of a high converter proportion, fewer directly coupled synchronous generators accordingly feed into the electricity supply grid and therefore in principle less inertia is available for stabilizing the electricity supply grid. This is able to be compensated by virtue of the fact that, using strict or fast control, that is to say a high controller gain, any frequency deviation or changes are responded to more quickly.

As an alternative, it is also possible to switch over to a power controller with higher gain and/or a smaller time constant if a higher converter proportion has been estimated. By virtue of such a controller switchover, rather than a continuous change, it is in particular also possible to avoid a situation whereby control gains are constantly changed in the ongoing process, which may lead, in an unfavorable scenario, to undesired oscillation.

According to one embodiment, it is proposed for a power controller to be selected from a prepared number of different power controllers depending on the estimated converter proportion, wherein the prepared number of different power controllers may have different controller structures and/or different frequency-power characteristic curves.

By virtue of this solution, it is possible to respond to different grid situations that result due to a converter proportion of varying magnitude not only in terms of gain, but rather other control operations may also be provided on a structural basis. By way of example, a frequency-dependent power curve with a dead time region may be provided in the case of a small converter proportion, whereas such a dead time region may be dispensed with or be selected so as to be smaller in the case of a high converter proportion if it is intended to respond to changes as quickly as possible in order to compensate a lower proportion of synchronous generators with corresponding inertia.

A further example of a different controller structure is that of being able to provide a pure P-controller for the frequency-dependent power control in the case of a low converter proportion, this also permitting a residual control deviation. If the converter proportion is however higher, such that the frequency return to the nominal frequency by directly coupled synchronous generators is attenuated, there may be provision for the converter-controlled feeding-in device to have a controller, in particular a controller with an I-component, that is able to achieve stationary accuracy for the frequency.

According to a further embodiment, it is proposed for a voltage-impressing power control operation to be used depending on the estimated converter proportion, or for its component, that is to say the component of the voltage-impressing power control operation on the control of the fed-in power, to be set by way of a weighting. In the case of an estimated high converter proportion, it is thus proposed to weight a voltage-impressing power control operation more greatly, so that this is incorporated to a greater extent. A voltage-impressing power control operation and thus therefore also a voltage-impressing infeed not only feeds in in a voltage-impressing manner but rather this also means that the control operation responds directly to voltage changes. The control operation is in this respect already systemically faster.

Such a voltage-impressing power control operation or infeed is in particular faster, in terms of grid support or grid stabilization, than a current-impressing infeed, which often responds only indirectly to voltage changes. In the case of a high converter proportion, that is to say in the case of a low proportion of directly coupled synchronous generators, this voltage-impressing power control operation or power infeed is thus again able to compensate the voltage impression or voltage support that has become weaker due to directly coupled synchronous generators that then no longer perform feeding or perform feeding to a lesser extent.

It is preferably proposed for a power control operation with a virtual inertia to be used depending on the estimated converter proportion, or for its component on the control of the fed-in power to be set by way of a weighting.

The basis here is the finding that, in the case of synchronous generators directly coupled to a return, their control influence also diminishes. Such directly coupled synchronous generators have a specific and fundamentally well-known behavior that usually acts in a supporting manner on the electricity supply grid and, in order to compensate the reduction of such directly coupled synchronous generators, it is thus proposed for their behavior to be compensated by corresponding control operation. The proposed power control operation with a virtual inertia is thus a control operation that at least partly emulates the behavior of a directly coupled synchronous generator.

According to the disclosure a converter-controlled feeding-in device, in particular a wind turbine or a wind farm, is also proposed. This converter-controlled feeding-in device is intended to feed electric power into an electricity supply grid having a grid voltage at a grid frequency having a grid nominal frequency.

The converter-controlled feeding-in device comprises a feeding-in device for feeding in an infeed current as electric AC current having a frequency, phase and having an infeed voltage, a control device for setting at least one of the variables from the list comprising:
- a frequency of the infeed current,
- a phase of the infeed current,
- a fed-in power and
- an infeed voltage,
- an estimation device configured so as to estimate a converter proportion in a grid section of the electricity supply grid, wherein the converter proportion defines a ratio of power fed in by way of converters to overall fed-in power, and
- an adaptation device for adjusting the controlling of the infeed of the electric power depending on the estimated converter proportion.

Such a feeding-in device is designed in particular as a converter or inverter. A converter has an AC voltage at input, whereas an inverter has a DC voltage at input. Both devices however control an infeed current at output. In this respect, the feeding-in device is a converter-controlled infeed, because it has a converter or inverter as feeding-in device. The converter-controlled feeding-in device may however have a plurality of, in particular a large number of such converters or inverters. Even if the feeding-in device is only one wind turbine, this may have a plurality of converters or inverters. The output of these converters or inverters may for example be connected in parallel in order thereby to convert the overall generated power from the wind turbine into the infeed current.

The control device may in particular be intended to drive the converter or inverter. The converter or inverter is preferably able to be switched between current-impressing and voltage-impressing operation.

The control device is able to drive this converter or inverter and thereby predefine in particular a frequency, phase and amplitude of a current to be fed in while maintaining a corresponding infeed voltage.

In the case of using a wind farm that has a plurality of wind turbines and in particular feeds into the electricity supply grid via a common grid connection point, each wind turbine may have at least one feeding-in device, that is to say at least one converter or one inverter, and in each case one control device. In addition, a central farm controller, which may also be understood to be part of the control device, may be provided for the wind farm. Any evaluations of the converter proportion may in particular be performed centrally by the central farm controller.

An estimation device, which may be part of the central farm controller but may also be part of the control device, is additionally provided. This estimation device performs at least one described estimate of a converter proportion.

The adaptation device that adjusts the control of the infeed of the electric power depending on the estimated converter proportion is likewise provided. This may include it changing parameters and/or selecting between different control functions or between different characteristic curves. By way of example, the adaptation device may for this purpose give a corresponding selection signal to the control device or the feeding-in device. The adaptation device may however in principle also be part of the feeding-in device or of the control device.

It is in particular proposed for the converter-controlled feeding-in device to be configured so as to execute a method for feeding in electric power according to at least one embodiment described above. The control device and, in addition or as an alternative, the adaptation device is in particular configured so as to execute this. For this purpose, corresponding algorithms may be implemented in the control device and/or in the adaptation device. In particular in the case of a wind farm as converter-controlled feeding-in device, there may be provision for implementation in a central farm controller.

BRIEF DESCRIPTION OF THE SEVERAL VIEWS OF THE DRAWINGS

The invention is illustratively explained in more detail below on the basis of embodiments with reference to the accompanying figures.

DETAILED DESCRIPTION

Figure 1:
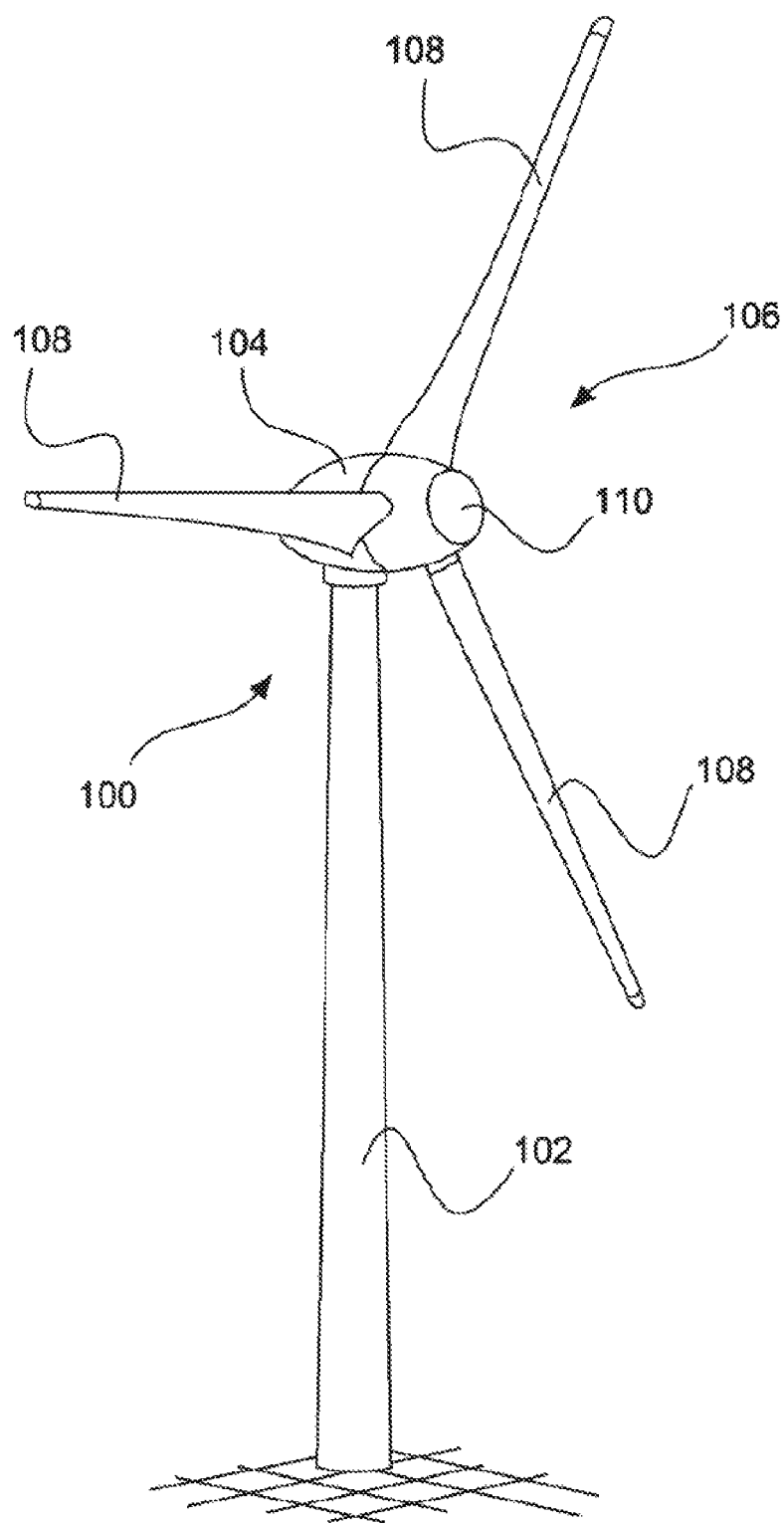
FIG. 1 shows a perspective illustration of a wind turbine.

FIG. 1 shows a wind turbine 100 having a tower 102 and a nacelle 104. A rotor 106 having three rotor blades 108 and a spinner 110 is arranged on the nacelle 104. The rotor 106 is set in rotational movement during operation by the wind and thereby drives a generator in the nacelle 104.

Figure 2:
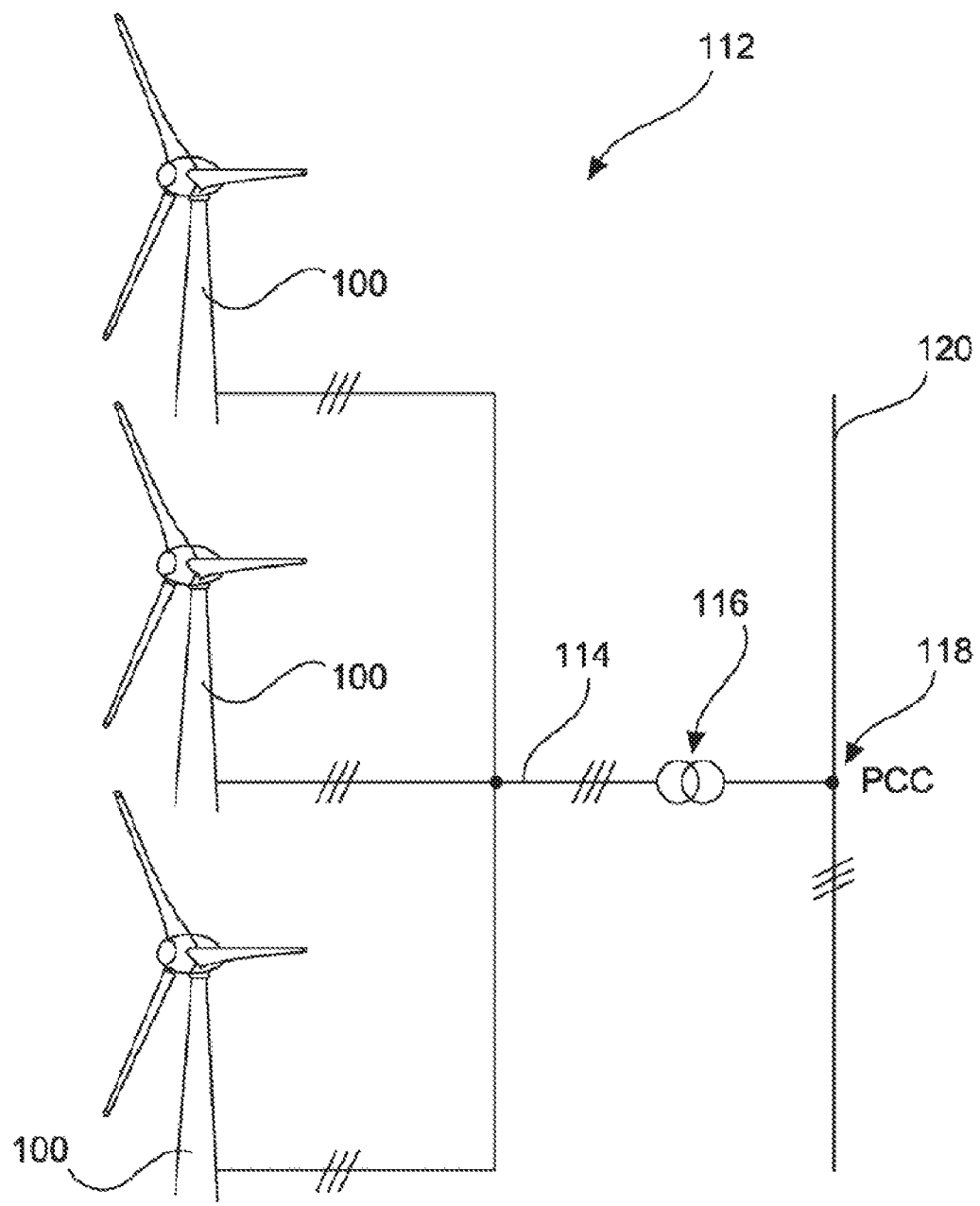
FIG. 2 shows a schematic illustration of a wind farm.

FIG. 2 shows a wind farm 112 having for example three wind turbines 100, which may be identical or different. The three wind turbines 100 thus in principle represent any desired number of wind turbines of a wind farm 112. The wind turbines 100 provide their power, namely in particular the generated current, via a farm electricity grid 114. In this case, the respectively generated currents or powers from the individual wind turbines 100 are summed and there is usually provision for a transformer 116 that boosts the voltage in the farm in order then to feed it into the supply grid 120 at the feeding-in point 118, which is generally also referred to as PCC. FIG. 2 is merely a simplified illustration of a wind farm 112 that does not for example show a controller, even though a controller is of course present. The farm grid 114 may also for example be designed differently, for example in that a transformer is also present at the output of each wind turbine 100, to cite just one other exemplary embodiment.

Figure 3:
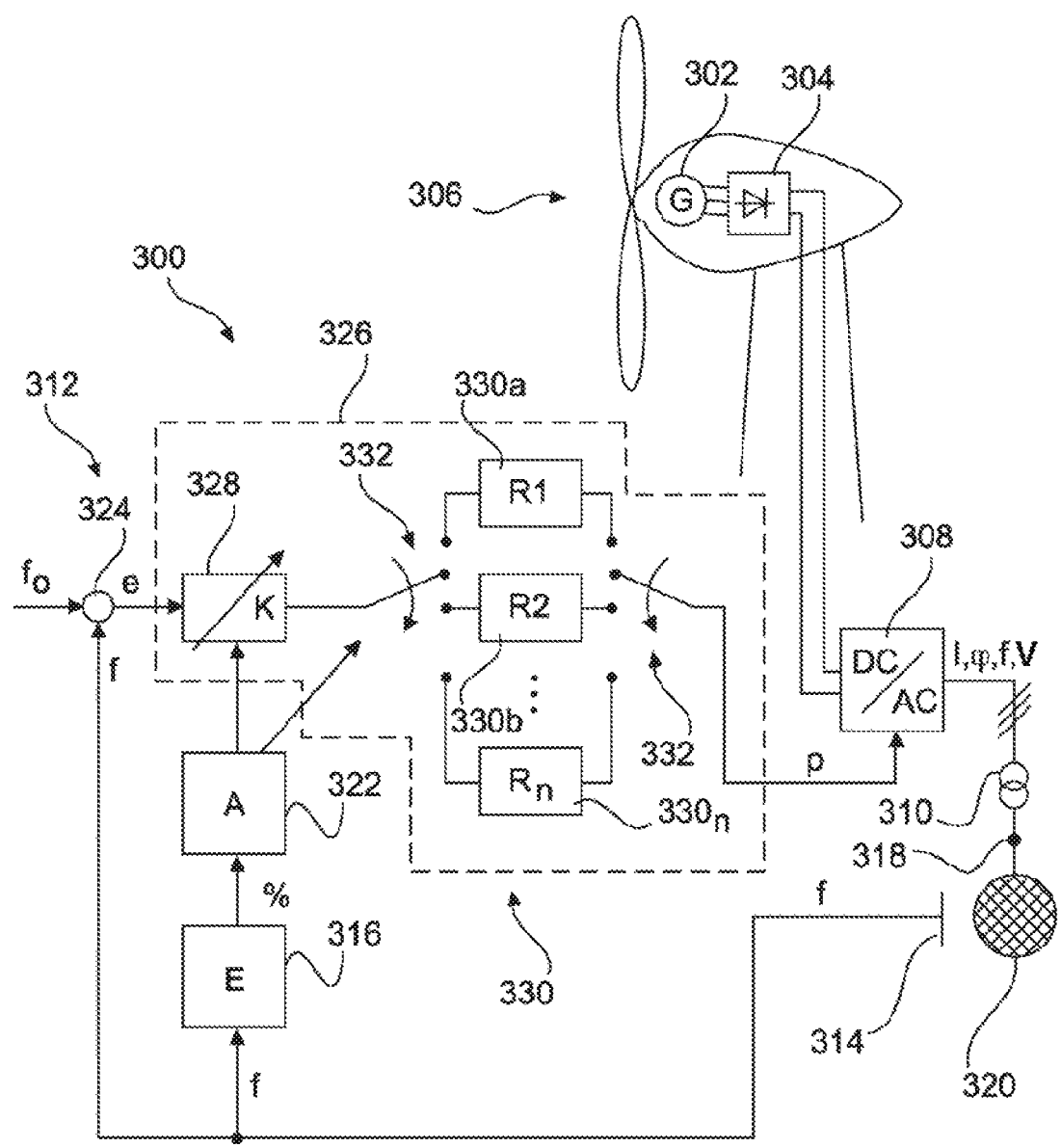
FIG. 3 shows a schematic illustration of a converter-controlled feeding-in device.

FIG. 3 schematically shows a converter-controlled feeding-in device 300 together with an electricity supply grid 320 into which the converter-controlled feeding-in device feeds at a grid connection point 318. The converter-controlled feeding-in device 300 is illustrated here as a wind turbine having a rotor 306 and a generator 302. During operation, the generator 302 thus generates a multiphase electric AC current that is rectified in the rectifier 304 and is fed to the inverter 308. The inverter 308 then generates a three-phase AC current I, wherein a phase φ, the frequency f and an infeed voltage V are also predefined. This AC current generated in this way is then fed into the electricity supply grid 320 via the transformer 310 at the grid connection point 318. By predefining the fed-in current I, the phase angle φ and the voltage V or taking into account the grid voltage U, it is thus possible to feed electric power into the electricity supply grid 320.

FIG. 3 in this respect then schematically illustrates details of an active power control operation. For this purpose, a control structure 312 is indicated, this in principle being able to be part of the indicated wind turbine, but having been extracted in FIG. 3 for illustrative purposes.

A frequency in the electricity supply grid 320 is first of all recorded by way of a measurement sensor 314. The measurement sensor 314 that records a frequency f, namely the grid frequency f, is also in particular understood to be representative here for other or further measurement sensors. It also in particular comes into consideration for the measurement sensor 314 actually to record just a voltage and for this voltage then to be able to be evaluated at another point in order to derive the frequency therefrom. The measurement may take place at the grid connection point 318.

This grid frequency f is required for several purposes according to the embodiment shown in FIG. 3. It is firstly supplied to the estimation device 316. A converter proportion in the electricity supply grid 320 is estimated in the estimation device 316 on the basis of this supplied grid frequency f. This may be performed for example in the manner explained below in connection with FIG. 4.

The estimated result, that is to say the estimated converter proportion in the electricity supply grid 320, is then given to the adaptation device 322, this being illustrated by the % symbol.

The adaptation device 322 may then adjust parts of the control structure 312 according to the estimated converter proportion.

Secondly, the recorded grid frequency f is used for a frequency-dependent power control operation. For this purpose, there is a comparison with a predefined reference frequency $f_0$ in the summing element 324. The control deviation e then forms the input of the actual controller 326. This control structure with the inputting of the control error e should also likewise be understood to be representative for other control concepts. It comes into consideration for example for the recorded grid frequency f to be supplied directly to a frequency-dependent functional block instead of being supplied to the summing element 324.

The controller 326 illustrated in FIG. 3 has a settable controller gain K in the gain block 328 and controller functional blocks 330. In this case, a plurality of different controller functional blocks 330 a, 330 b to 330 n are provided, it being possible to switch between these. A selection switch 332 for switching purposes and that consists of one part upstream and one part downstream of the controller functional blocks 330 is shown by way of illustration. This selection switch 332 may be driven by the adaptation device 322. This selection switch 332 is in this respect also considered here to be representative for other implementations, namely in particular an implementation in which it is possible to switch between different control blocks, and therefore different control functionalities, within a process computer.

The gain block 328 may also be driven by the adaptation device 322. As an alternative, the gain block 328 may in each case be part of the controller functional blocks 330. It also however comes into consideration for the adaptation device 322 both to change a gain factor K, namely by driving the gain block 328 or in another way, and to furthermore select between a controller functional block of the controller functional blocks 330. Greater flexibility when adjusting the respective controller is thereby possible. The corresponding driving for changing the gain factor K or for switching between controller functional blocks 330 thus takes place depending on an estimated converter proportion.

A frequency-dependent active power control operation is then performed with the respectively selected controller setting, that is to say the set gain factor of the gain block 328 and the selected controller function according to the selected controller block of one of the control blocks 330. The controller 326 thus outputs an active power P depending on the recorded grid frequency, here namely depending on the control error e, and this active power P is given to the inverter 308, which then accordingly generates the infeed current I.

Figure 4:
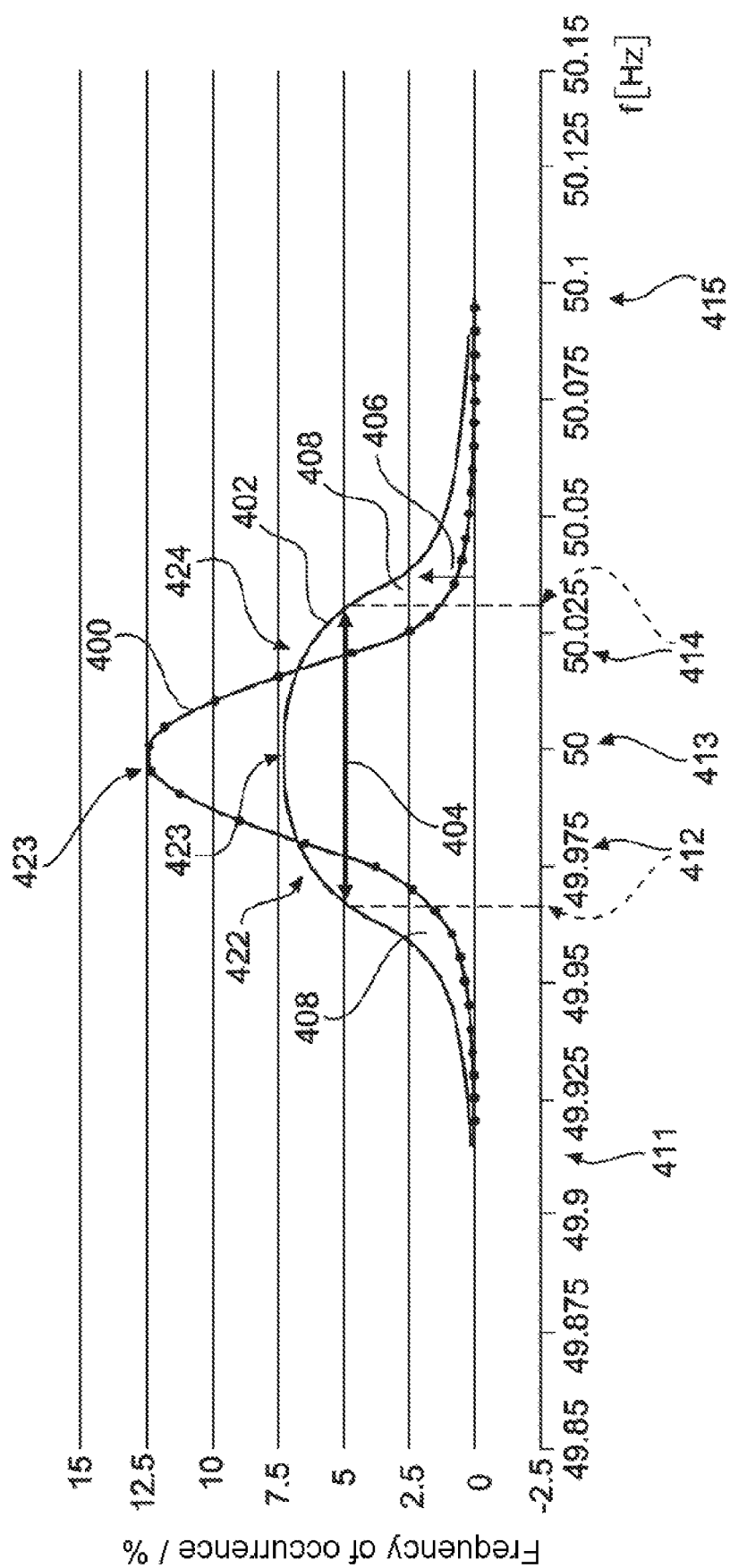
FIG. 4 shows a frequency of occurrence function with a reference function.

FIG. 4 shows a graph of a frequency of occurrence or frequency of occurrence density in which the frequency of occurrence in percent is plotted against the frequency in hertz. The graph thus indicates how often which frequency values have occurred as a percentage. For this purpose, a frequency of occurrence measurement curve has been recorded, which is also plotted here as a reference curve or reference function 400. The reference function 400 that is shown has been recorded for an electricity supply grid without a converter proportion, that is to say with a converter proportion equal to zero. One possible frequency of occurrence function 402 that corresponds to a current frequency of occurrence function in the case of a high converter proportion in the electricity supply grid is also plotted. Both the reference function 400 and the current frequency of occurrence function 402 are characterized by a few frequency values, namely, with increasing frequency, initially the starting frequency 411, then the lower reference frequency 412, followed by the main frequency 413, followed again by the upper reference frequency 414 and finally the end frequency 415. In the region of the main frequency 413, both the reference function 400 and the current frequency of occurrence function 402 each have a frequency of occurrence maximum value 423 or 423', respectively.

A lower frequency of occurrence reference value 422 and an upper frequency of occurrence reference value 424 may be assigned to the lower reference frequency 412 and to the upper reference frequency 414, respectively. Neither the lower and upper reference frequency 412 and 414 nor the associated lower frequency of occurrence reference value 422 or upper frequency of occurrence reference value 424 have to be the same for the reference function 400 and the frequency of occurrence function 402. Depending on the evaluation, the frequency values or the frequency of occurrence reference values may differ between the reference function 400 and the frequency of occurrence function 402.

In addition to evaluating the amplitude of the frequency of occurrence maximum value 423 or 423', other evaluation variants also come into consideration.

One evaluation variant proposes for the width 404 of the frequency of occurrence function 402 to be taken into consideration. The width 404 is preferably taken into consideration at a fixed frequency of occurrence value; the frequency of occurrence value of 5% is used for this in the present case. The indicated width 404 has in this respect been plotted for illustrative purposes. It also comes into consideration to use this exemplary value of 5% both as the upper and as the lower frequency of occurrence reference value 422 or 424 and to take the lower or upper reference frequency 412 or 414 that sets in into consideration for this purpose and to use it to determine the distance of the difference between these two values.

According to another embodiment, it comes into consideration to consider an upward deviation of the recorded frequency of occurrence function 402 in comparison with the reference function 400 in the region outside of the two reference frequencies 412, 414, that is to say for regions below the lower reference frequency 412 and above the upper reference frequency 414. Such an increase in this region is indicated by the symbolic increase arrow 406. A corresponding frequency value may also be considered for this purpose, for example. By way of example, it comes into consideration, for this purpose, to set the upper reference frequency 414 to a higher but predetermined value, and likewise to set the lower reference frequency 412 to a lower value, this not being indicated expressly here but being able to be in the region of the dashed line.

It also comes into consideration to consider an integral area 408, namely the area underneath the recorded frequency of occurrence function 402 and above the reference function 400. This is thus essentially the region above the upper reference frequency and below the lower reference frequency 414 and 412, respectively, if these two reference frequencies are defined according to what is illustrated in FIG. 4 with the non-dashed arrows.

This integral or these two integrals together may be recorded as a deviation integral or deviation integral value and compared with a reference value or a reference scale in order to estimate a converter proportion in the grid therefrom.

As a further variant, it comes into consideration to record an FFT of the grid voltage V. The result is a voltage spectrum for which one example is plotted in FIG. 5. The example in FIG. 5 is based on an electricity supply grid having a nominal frequency of 50 Hz, which is in this case also approximately the main frequency.

Figure 5:
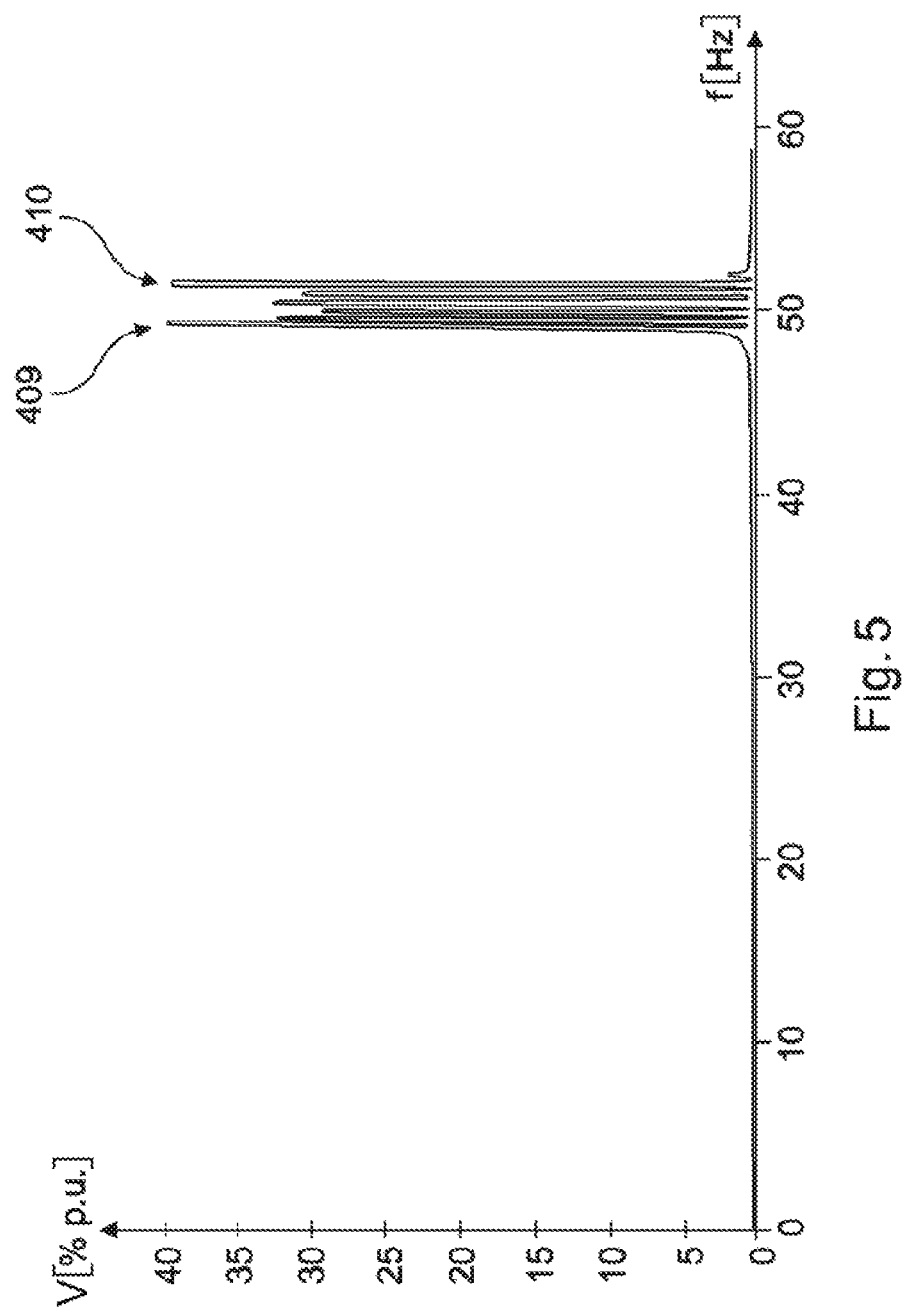
FIG. 5 shows a graph of a voltage spectrum of a grid voltage in illustrative form.

It is able to be seen in particular in the voltage spectrum in FIG. 5 that this is essentially grouped around the value of 50 Hz. In this case however, there is no singular frequency of occurrence maximum value at precisely 50 Hz, that is to say precisely at the nominal frequency or main frequency, but rather here two local maximum values 409 and 410 flanking the nominal frequency or main frequency. In order to estimate a converter proportion in the grid, these two local maxima or local maximum values may be evaluated and a common maximum value may be formed therefrom, for example by summing or average formation. This may then be used as a basis for estimating the converter proportion.

Figure 6:
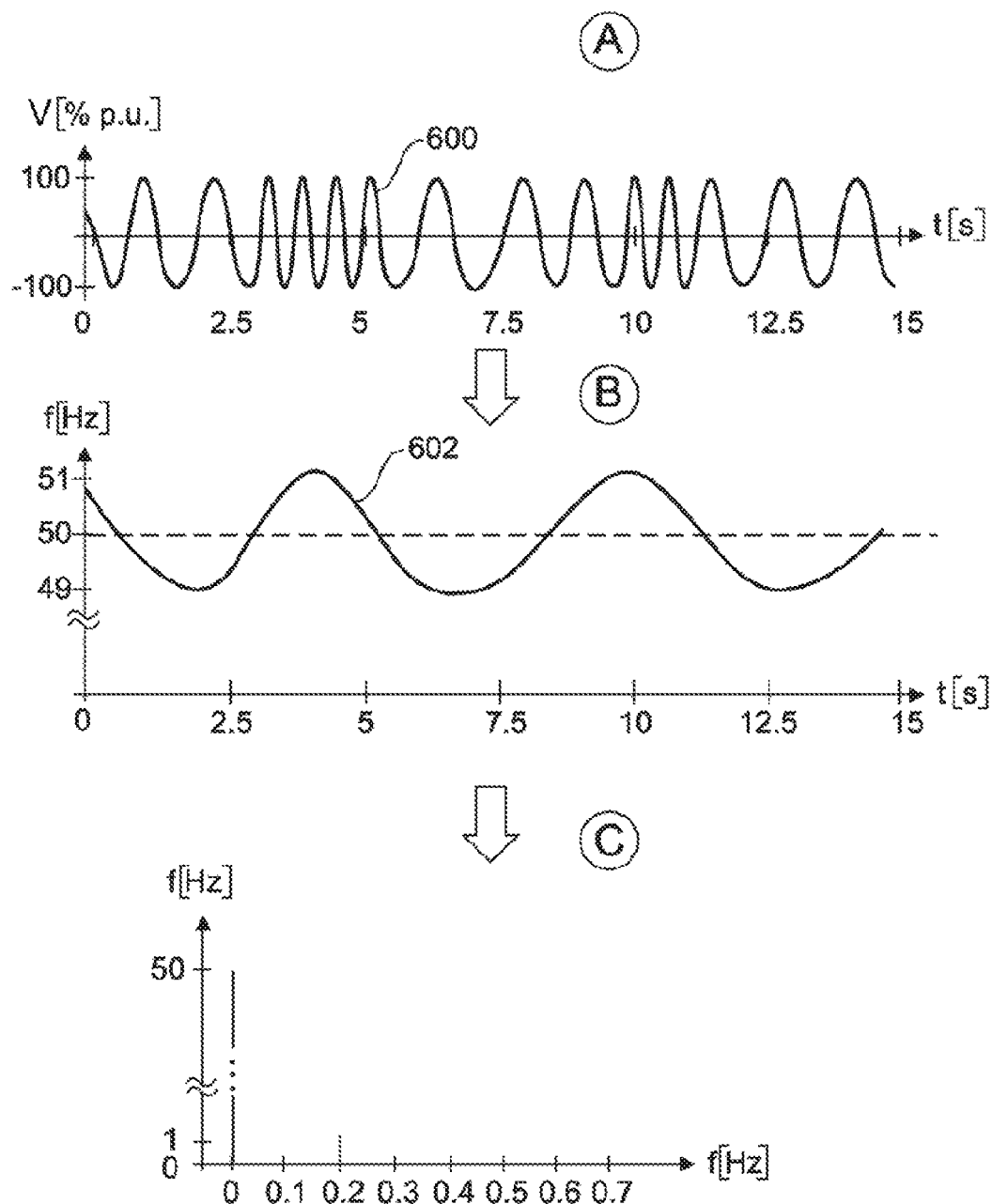
FIG. 6 shows three graphs for illustrating a fluctuation spectrum.

Yet another variant that may also be combined with those described above is that of evaluating a fluctuation spectrum. FIG. 6 contains three graphs A to C by way of illustration.

The first graph A illustrates a voltage profile, for example at the grid connection point 318 according to FIG. 3. This voltage profile should be understood to be schematic and is intended to symbolize for instance a sinusoidal profile with fluctuating frequencies. The voltage curve 600 therefore has, in a magnified manner, various lengths of period durations. The voltage curve 600 therefore resembles a concertina. It should in any case be clarified there that this voltage curve 600 fluctuates in terms of its sinusoidal profiles over the time t. The time t is plotted in the graph A from 0 to 15 seconds. In this time, the voltage curve 600 changes roughly two and a half times back and forth between long and short period duration. Its frequency thus fluctuates roughly two and a half times back and forth in these 15 seconds.

This may be depicted as a frequency profile over time, this being illustrated in graph B. Graph B thus shows a frequency curve 602 over time. It is assumed that a fixed frequency of 50 Hz would have set in without frequency fluctuation. In this respect, it is once again repeated that graph A is illustrative. In fact, apart from the fluctuations, graph A shows a signal at approximately 1 Hz. It is nevertheless assumed that the signal has a fundamental frequency of 50 Hz and, in this respect, graph A with the roughly sinusoidal forms is intended to symbolize just a 50 Hz signal.

In any case, it is able to be seen in graph B that the frequency curve 602 oscillates around this main frequency of 50 Hz.

This oscillating signal, that is to say this oscillating frequency curve 602, may then be evaluated as a spectrum. Since the frequency is investigated as a function of time in graph B, the conversion into a spectrum gives a frequency as a function of a frequency.

Graph C shows this associated frequency spectrum. The frequency in Hz is thus plotted against the frequency in Hz in graph C. This results in a value on the abscissa at 0 Hz, and the amplitude there is 50 Hz. The fundamental oscillation thus has an amplitude of 50 Hz, and it does not change and is therefore 0 Hz. The frequency curve 602 of graph B also however fluctuates around this 50 Hz value. This fluctuation is such that it fluctuates from 49 to 51 Hz. The fluctuation amplitude is thus 1 Hz. It also fluctuates twice back and forth in 10 seconds, resulting in a frequency of 0.2 Hz. This fluctuation of the frequency curve 602 in graph B is thus a value with the amplitude 1 Hz at a frequency of 0.2 Hz in the spectral illustration in graph C.

In this respect, this investigation of the fluctuation spectrum is also a low-frequency investigation. Graph C in FIG. 6 should however likewise be understood only to be illustrative, and not only a single spectral value but rather a plurality of spectral values should in principle be expected in the case of such an investigation of the fluctuation spectrum. In any case, it is possible to infer the converter proportion in the grid from such spectral values of the frequency spectrum illustrated in graph C. It is in particular proposed for the converter proportion to be estimated to be smaller the greater the fluctuation amplitudes. The fluctuation amplitude of the signal in FIG. 6, according to the illustration in graph C, is 1 Hz, and its value is 0.2 Hz.

The invention claimed is:

1. A method for feeding electric power into an electricity supply grid having a grid voltage at a grid frequency having a grid nominal frequency using a converter-controlled feeding-in device, comprising:
   feeding, by the feeding-in device, the electric power in an infeed current that is an AC current having a frequency, a phase and an infeed voltage, wherein at least one of the frequency of the infeed current, the phase of the infeed current, the fed-in electric power and the infeed voltage is configurable;
   estimating a converter proportion in a grid section of the electricity supply grid, wherein the converter proportion represents a ratio of power fed in by way of converters to an overall fed-in power; and
   controlling the feeding of the electric power depending on the estimated converter proportion.

2. The method as claimed in claim 1, comprising:
   recording a cyclic change in the grid frequency as an amplitude or cycle time; and estimating the converter proportion based on the recorded amplitude or the recorded cycle time, wherein:
the converter proportion is estimated to be positively correlated with the amplitude of the cyclic change,
the converter proportion is estimated to be negatively correlated with the cycle time, or
the converter proportion is estimated based on a quotient of the amplitude of the cyclic change to the cycle time of the cyclic change.

3. The method as claimed in claim 2, comprising:
classifying the estimated converter proportion as either a high converter proportion or a low converter proportion, wherein the estimated converter proportion is classified as the high converter proportion when the amplitude of the cyclic change is greater than a predefined amplitude limit or the estimated converter proportion is classified as the high converter proportion when the cycle time is shorter than a predefined cycle time limit.

4. The method as claimed in claim 1, comprising:
recording a frequency of occurrence or a frequency of occurrence density of the frequency or a frequency gradient; and
estimating the converter proportion based on the recorded frequency of occurrence or the frequency of occurrence density.

5. The method as claimed in claim 4, wherein:
the frequency of occurrence or the frequency of occurrence density is a frequency of occurrence function based on the frequency, and the frequency of occurrence function:
has a frequency of occurrence maximum value in a region of a main frequency or the grid nominal frequency;
increases from a starting frequency that is less than the main frequency to the region of the main frequency;
drops from the region of the main frequency to a predefined end frequency that is greater than the main frequency;
has a lower frequency of occurrence reference value at a first reference frequency that is greater than the starting frequency and less than the main frequency; and
has an upper frequency of occurrence reference value at a second reference frequency that is greater than the main frequency and less than the end frequency, and
the method comprises:
estimating the converter proportion based on the frequency of occurrence maximum value.

6. The method as claimed in claim 5, wherein:
the converter proportion is estimated to be negatively correlated with the frequency of occurrence maximum value,
the converter proportion is estimated to be positively correlated with a distance between the first and second reference frequency, or
the converter proportion is estimated to be positively correlated with the greater the upper and lower frequency of occurrence reference value.

7. The method as claimed in claim 5, comprising:
classifying the estimated converter proportion as either a high converter proportion or a low converter proportion, wherein the estimated converter proportion is classified as the high converter proportion when the frequency of occurrence maximum value lies below a predefined frequency of occurrence limit value, the estimated converter proportion is classified as the high converter proportion when a distance between the upper and lower reference frequency is greater than a predefined reference distance, or the estimated converter proportion is classified as the a high converter proportion when the upper or lower frequency of occurrence reference value lies above a predefined basic limit value.

8. The method as claimed in claim 5, wherein a reference function is predefined for the frequency of occurrence or frequency of occurrence density and the converter proportion is estimated depending on a deviation of the frequency of occurrence function from the reference function.

9. The method as claimed in claim 8, comprising:
selecting the frequency of occurrence function for a converter proportion of zero as the reference function;
obtaining a difference function as a difference between the frequency of occurrence function and the reference function, and integrating the difference function for frequency regions below the first reference frequency and above the second reference frequency to produce a deviation integral; and
estimating the converter proportion based on the deviation integral.

10. The method as claimed in claim 9, wherein only positive regions of the difference function are integrated to produce the deviation integral.

11. The method as claimed in claim 5, comprising:
estimating the converter proportion based on a deviation of the main frequency from the grid nominal frequency such that the converter proportion is estimated to be positively correlated with the deviation of the main frequency from the grid nominal frequency.

12. The method as claimed in claim 5, comprising:
estimating the converter proportion based on a distance between the first and second reference frequencies, wherein the first and second reference frequencies are a predefined lower and upper frequency of occurrence reference values, respectively; or
estimating the converter proportion based on the lower or upper frequency of occurrence reference values that are predefined lower or upper reference frequencies, respectively.

13. The method as claimed in claim 12, wherein the lower and upper frequency of occurrence reference values are the same.

14. The method as claimed in claim 1, comprising:
recording a fluctuation spectrum representing fluctuations of the frequency over time as a frequency spectrum of the grid frequency; and
estimating the converter proportion based on the fluctuation spectrum.

15. The method as claimed in claim 14, comprising:
estimating the converter proportion based on at least one fluctuation amplitude of a fluctuation frequency of the fluctuation spectrum, wherein the fluctuation frequency lies in a range from 0.1 Hz to 0.5 Hz, wherein the converter proportion is estimated to be negatively correlated with the fluctuation amplitude.

16. The method as claimed in claim 1, comprising:
recording a voltage spectrum of the grid voltage using a fast Fourier transform of an FFT of the grid voltage; and
estimating the converter proportion based on the voltage spectrum.

17. The method as claimed in claim 16, wherein the converter proportion is estimated to be negatively correlated with a maximum value, a sum of a plurality of maximum values, or an average of the plurality of maximum values.

18. The method as claimed in claim 17, comprising:
classifying the estimated converter proportion as either a high converter proportion or a low converter proportion, wherein a distinction is drawn between a high and a low an estimate of the converter proportion, and the converter proportion is classified as the high converter proportion when the maximum value, the sum of the plurality of maximum values or the average of the plurality of maximum values lies below a predefined reference value.

19. The method as claimed in claim 1, comprising:
changing the fed-in power using a power control operation and based on a frequency deviation or a frequency gradient, wherein the power control operation depends on the estimated converter proportion, and wherein:
the power control operation has a controller gain or a controller time constant, and the controller gain or the controller time constant depends on the estimated converter proportion,
the controller gain is selected to be positively correlated with the estimated converter proportion and the controller time constant is selected to be negatively correlated with the estimated converter proportion, or
a power controller having a higher gain or a smaller controller time constant is used if a high converter proportion has been estimated than if a low converter proportion has been estimated.

20. The method as claimed in claim 1, comprising
selecting a power controller from a preconfigured number of different power controllers based on the estimated converter proportion, wherein the preconfigured number of different power controllers have different controller structures or different frequency-power characteristic curves.

21. The method as claimed in claim 1, comprising:
performing a voltage-impressing power control operation based on the estimated converter proportion or performing a component of the voltage-impressing power control operation based on the control of the fed-in power that is set by way of a weighting.

22. The method as claimed in claim 1, comprising:
performing a power control operation with a virtual inertia based on the estimated converter proportion or performing a component of the power control operation based on the control of the fed-in power that is set by way of a weighting.

23. A converter-controlled feeding-in device for feeding electric power into an electricity supply grid having a grid voltage at a grid frequency having a grid nominal frequency, comprising:
a converter or an inverter configured to feed in an infeed current as electric AC current having a frequency, a phase and an infeed voltage;
controller configured to:
set at least one of the frequency of the infeed current, the phase of the infeed current, the fed-in electric power and the infeed voltage;
estimate a converter proportion in a grid section of the electricity supply grid, wherein the converter proportion represents a ratio of power fed in by way of converters to an overall fed-in power; and
adjust a control of the electric power based on the estimated converter proportion.

24. The method as claimed in claim 1, wherein the converter-controlled feeding-in device is a wind farm or a wind turbine.

* * * * *

UNITED STATES PATENT AND TRADEMARK OFFICE
CERTIFICATE OF CORRECTION

PATENT NO. : 10,862,308 B2
APPLICATION NO. : 16/622201
DATED : December 8, 2020
INVENTOR(S) : Johannes Brombach Page 1 of 1

It is certified that error appears in the above-identified patent and that said Letters Patent is hereby corrected as shown below:

In the Claims

Column 21, Claim 6, Line 58:
"correlated with the greater the upper and lower" should be: --correlated with the upper and lower--.

Column 22, Claim 16, Line 62:
"transform of an FFT of the grid voltage; and" should be: --transform of the grid voltage; and--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*